March 10, 1931.  W. L. WARD  1,795,748
TRAIN ANNOUNCING APPARATUS
Original Filed April 22, 1927   4 Sheets-Sheet 1
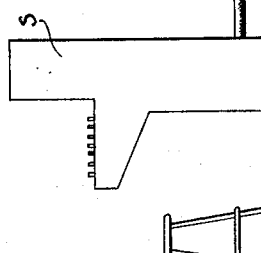
Inventor
Walter L. Ward,
By Bates, Macklin, Golrick Hearn
Attorneys

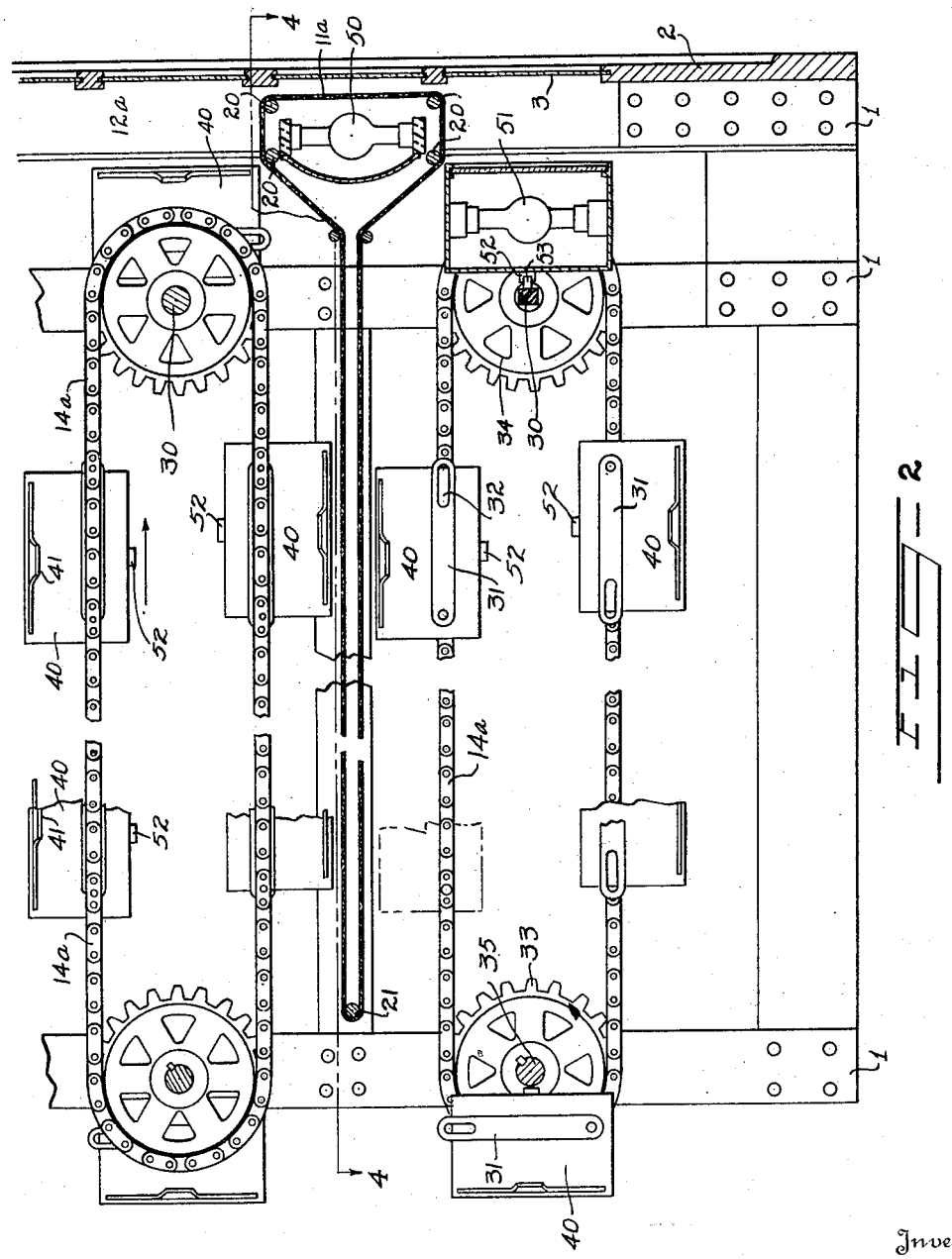

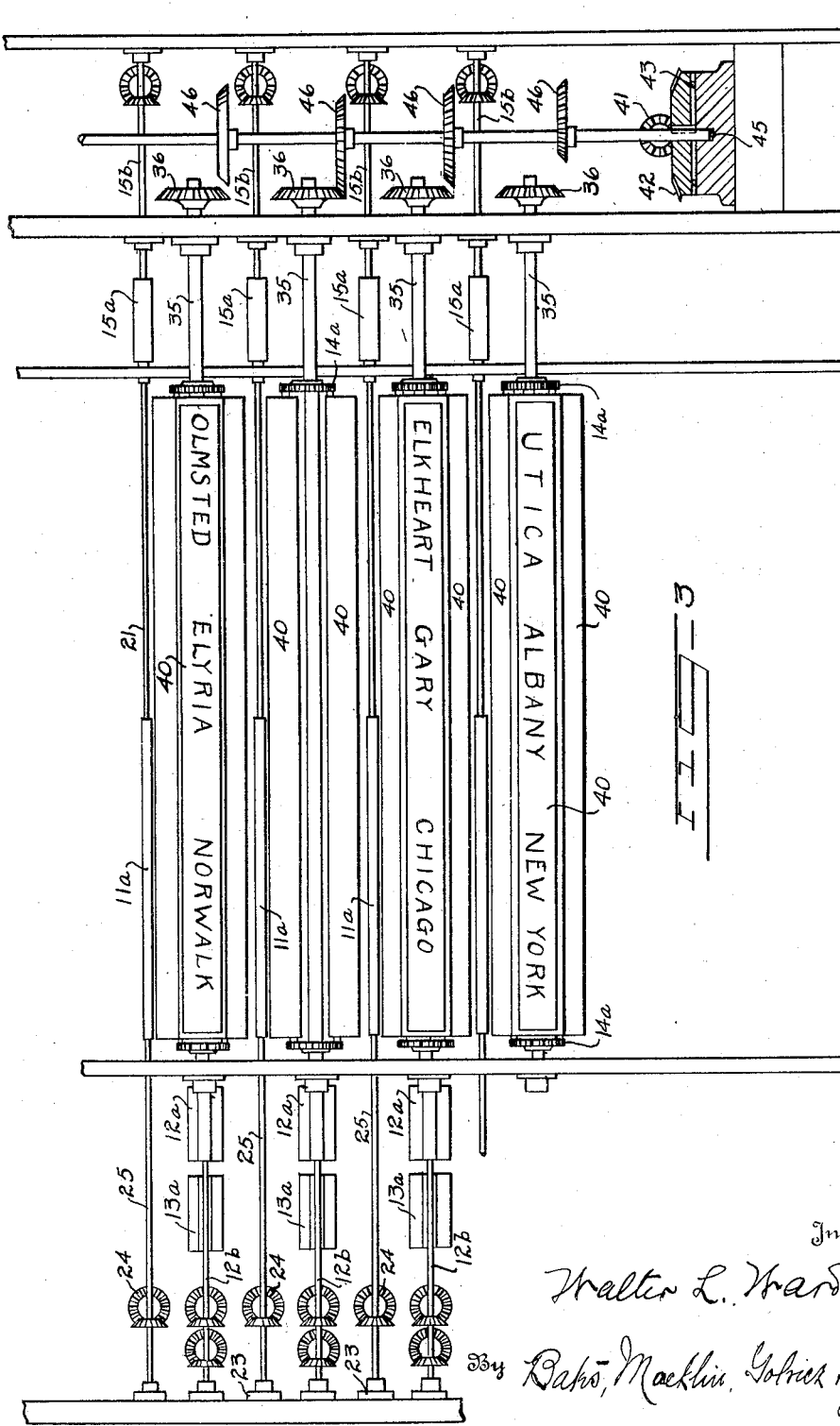

March 10, 1931.    W. L. WARD    1,795,748
TRAIN ANNOUNCING APPARATUS
Original Filed April 22, 1927    4 Sheets-Sheet 4
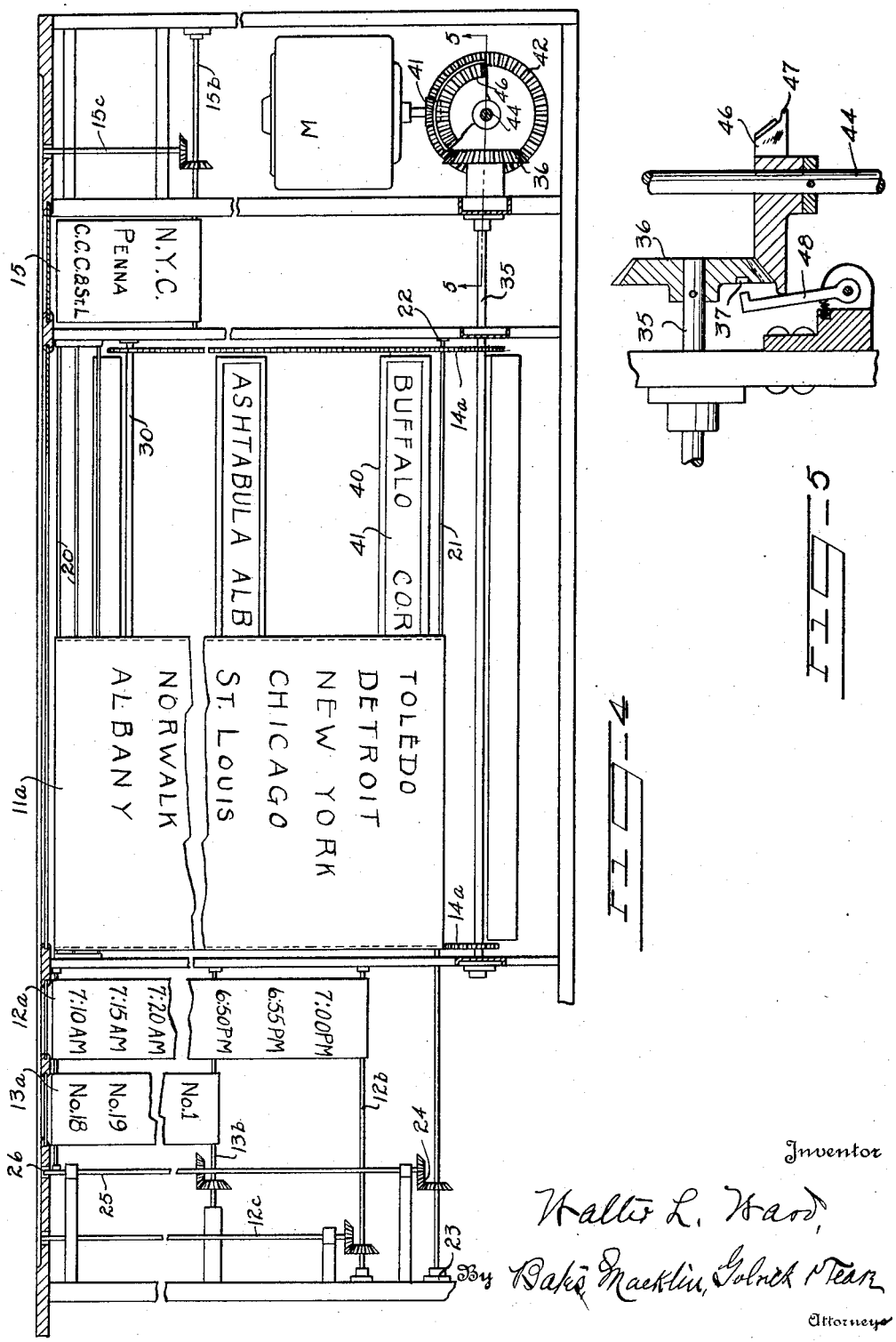

Patented Mar. 10, 1931

1,795,748

UNITED STATES PATENT OFFICE

WALTER L. WARD, OF WHEELING, WEST VIRGINIA, ASSIGNOR OF ONE-HALF TO GEORGE J. ROGERS, OF WHEELING, WEST VIRGINIA

TRAIN-ANNOUNCING APPARATUS

Original application filed April 22, 1927, Serial No. 185,881. Divided and this application filed December 16, 1927. Serial No. 240,443.

This invention is concerned with the provision of mechanism for visually announcing the departure of trains as set forth in my original application Serial No. 185,881, April 22, 1927, and the subject matter of the present application constitutes a division thereof.

One of the objects of my invention is to provide mechanism for displaying complete information about each train and indicating the gate and route leading to the train which is about to leave.

Another object is to provide mechanism which will visually display, for a conveniently long time before the departure of any given train, complete information about the train, that is, the particular railroad, the ultimate destination, track number, time of departure, and the en route stops.

A further object is to provide a panel or board of such design that all necessary information may be displayed at the proper time, but still having a restricted surface area consistent with its legibility. Further objects will appear from the following description of the apparatus constituting my invention. The essential characteristics are summarized in the claims.

In the drawings, Fig. 1 is an elevation of the illuminable panel and the control board associated therewith; Fig. 2 is a sectional view taken along the lines 2—2 of Fig. 1, showing a partial transverse section of the panel; Fig. 3 is a rear elevation of the panel showing the driving mechanism for changing the legends displayed thereon; Fig. 4 is a horizontal section looking downwardly on the panel along the plane 4—4 of Fig. 1; Fig. 5 is a section taken along the line 5—5 in Fig. 4 showing a single driving gearing with latch and securing mechanism associated therewith.

Referring particularly to Fig. 1, I indicate at 10 a panel section carrying a permanent legend to wit, "Train leaves for", "Track" and "Stop at". The other information shown at 11, 12, 13, 14 and 15 is adjustably positioned to appear upon the given panel section to designate a particular train. Thus at 15, by suitable initials the name of the railroad appears; at 11, the ultimate destination of the train; at 12, the hour of departure; at 13, the track number; and at 14, the various intermediate stops to be made by the train.

In Fig. 2 appears more clearly the construction of the apparatus by means of which the legends shown in Fig. 1 are presented. The panel is shown as constituting suitable frame work 1 and an apertured forward wall 2 in which glass panel sections 3 may be positioned. The legends 11 and 14 appearing in Fig. 1 are shown to be carried on the belt 11a and the chain conveyor 14a, though the legend 11 could be removably affixed to the glass panel section 3 and the belt 11a omitted.

The belt 11a if employed is carried and directed by suitable rollers or shafts 20, and is driven preferably by the shaft 21 near the rear of the panel structure. This belt may comprise a wide endless strip shown also in Fig. 4 which may be stenciled to carry the legend appearing on the face of the panel. Suitably disposed behind the glass portion of the panel section is a bank of lights 50 with a suitable reflector and connections for illuminating the legend. This belt carries the name to the ultimate destination, which may be manually set by rotation of the shaft 21 (see Fig. 4). The shaft 21 is journalled at 22 and 23. Drive is effected through bevel gearing 24, by the shaft 25 which extends to the front wall of the panel into an aperture 26 in the wall. The forward end of the shaft 25 may have a square shank which lies in the aperture 26, so that a crank may be fitted thereon for rotating the shaft and bringing the appropriate legend to register with the panel section.

The legend shown at 14 in Fig. 1, which designates the intermediate stops to be made by a particular train, are successively presented in groups similar to those shown. The belt or chain 14a carries a plurality of light boxes 40, shown also in Fig. 3 in which removable slides 41 are positioned, which carry the desired legends. Lights 51 are carried in each box. Contacts for each box are carried at 52, while fixed contacts 53 are carried on the fixed shaft 30, or other suitable support so that the circuits are established only for a box when it is positioned behind a panel section. It will be seen from Fig. 3 that the slides 41 of the boxes may be conveniently lettered with the names of about three stops, and I have provided switches within the box (not shown) so that one or more of the portions of the box may be darkened if a particular stop is to be omitted. The boxes are carried on the chain 14a by suitable links 31, which may have a slotted connection as at 32 to allow for the variation caused by angular displacement as the chain advances. The chain is carried by suitable sprockets 33 and 34. The sprocket 34 may be loosely mounted on a fixed shaft 30, and sprocket 33 may be keyed to the shaft 35 and be driven thereby. Referring to Figs. 3 and 4, I show shafts 35 suitably journalled in the frame, each shaft carrying a bevel gear 36.

A suitable driving motor M carries a pinion 41 to drive a ring gear 42, which may be carried on suitable anti-friction bearings 43. Keyed to the ring gear 42 is a vertical shaft 44 supported on a suitable bearing 45. The motor is adapted to run continuously so that the vertical shaft 44 continuously revolves. I desire, however, to present the light boxes 40 intermittently behind the panel sections, and to allow them to remain behind the section for a given length of time, and then advance the next adjacent box so that the legend carried by it, is presented for a similar length of time. In this manner all of the intermediate stops of a given train are presented in groups of two or three in spaced succession. As long as a particular train is being announced in a given panel section, this information is being continually presented. Segmental gears 46 are secured to the shaft 44 and are adapted to mesh with the bevel gear 36 thereby intermittently driving the shafts 35. Thus each of the boxes is carried to its forward or exposed position and permitted to rest in that position while one of the segmental gears 46 completes a revolution. It is then again advanced as the segmental gear comes into mesh again.

As pointed out above, when a particular train is being announced, current is supplied to the contacts 53 and each of the light boxes 40 are supplied with a current through contacts 52 when the box arrives in exposed position. To be certain that the box is stopped in registration with the panel section and that contact is maintained at the points 52 and 53, I provide a locking mechanism, shown in Fig. 5, for each one of the shafts 35. An indenture 37 is provided in the back of the bevel gear 36 and a cam surface 47 is provided on the periphery of the segmental bevel gear 46. A dog or latch 48 is resiliently urged into the indenture 37. The dog is engaged by the cam surface 47 so that the shaft 35 is permitted to rotate only when being positively driven by the segmental gear, and the shaft is held in fixed position as soon as the dog 48 is released by the cam 47 to enter the indenture 37.

Referring again to Figs. 1 and 4 and to the indicia indicated at 12, 13 and 15, that is, the initials standing for the name of the railroad, the hour of departure and the track number. These indicia are presented by lettered belts 12a, 13a and 15a. The belt 13a is mounted on suitable rollers or shafts including the shaft 13b, which is driven through suitable gearing by a shaft similar to the shaft 35 mentioned above, which may have a suitable shank on the forward end and which may extend into an aperture 13c on the forward wall of the panel so that the belt may be advanced in a manner similar to the advancing of the belt 11a. The belt 12a is provided with a driving shaft 12b and is driven through suitable beveled gearing and the shaft 12c in a similar manner. Belt 15a is driven in a similar manner through shafts 15b and 15c and bevel gearing as shown. All the shafts extend through or to the face of the panel, see Fig. 1.

Having described the mechanical structure of the device it can be seen that for any particular panel section indicia may be presented to identify the train and to designate the stops made by the train between the point of departure and the ultimate destination. The visibility of this indicia is of course, dependent upon the illumination provided by the lamps 50 and 51 and other suitable lamps at the ends of the panel sections not yet designated, that is, the lamps that illuminate the section portions 12, 13 and 15. It may be further borne in mind that after the motor M has been started, the light boxes 40 are continuously, though intermittently moved, by means of the segmental gears. As long as the particular panel section is dark nothing will appear in that section nor will a particular light box make its legend visible unless the light therein be illuminated.

In operation the operator will adjust the belts 11a, 12a, 13a and 15a to present the desired legend for a particular train, and will arrange the slides 41 in the light boxes 40 so that the intermediate stops by that train will be presented and illuminated. The mechanism just described will then present boxes 40 intermittently to the spectator, and allow them to remain in this position for a brief interval, that they may be read by the spectator and then advance the next adjacent box so that the legend carried by it is presented for a similar length of time. In this manner all the intermediate stops of a given train are presented in groups of two or three in spaced succession. As long as a particular train is being announced, this information is continuously displayed.

It will be understood from the above description that the motor is preferably operated continuously, thus progressing the various belts with periods of rest during the time the gear for any belt is out of engagement. It will also be understood that whether the legend brought to the panel by the belt is effective or idle depends on the illumination. This illumination may be controlled, if desired, by individual switches located at any convenient point, but I prefer to group all the switches in a switch board indicated at S in Fig. 1 and connected by a suitable cable with the various circuits. In this manner, an operator at the switch board may readily cause the display of whatever legends are desired.

I claim:

1. In an electric sign, the combination of a plurality of sign panel sections, each section of which is adapted to contain information distinguished from that presented in the other sections, permanent legends marked on each section, a plurality of endless belts disposed behind each section, said belts being lettered or stenciled, means for throwing light through the lettered or stenciled portions of the belts, means for positioning the belts to present different letters or symbols, an endless chain conveyor for each section and disposed behind the panel section, a plurality of light boxes carried by said chain conveyor, which is adapted to present one light box immediately behind the panel section, removable lettered or stenciled signs carried by each of the boxes, means for establishing a light circuit in a light box when it is in position behind the panel section, means for holding the box in position, means for driving said chain conveyor to advance the light boxes, said means including bevelled gears, a shaft, a motor for continuously driving said shaft, a plurality of segmental gears secured to the shaft and adapted to mesh with the bevelled gears for part of each revolution of the shaft, means associated with the bevelled gears for driving the chain conveyors when said bevelled gears are driven, the segmental gears being so placed that they mesh at different times with their corresponding bevelled gears, whereby all of the light boxes are intermittently advanced and successively presented.

2. In an electric sign having a display panel, a plurality of endless conveyors extending behind the panel, boxes containing lamps carried by the conveyors, fixed electrical contacts positioned near the panel, contacts carried by the said boxes and adapted to contact with the said fixed contacts when a box is presented in registration with the panel, a source of current connected to the said fixed contacts through said circuits for supplying current to the lamps in the said boxes, means for intermittently driving said conveyors to advance the light boxes at different times including a continuously rotating shaft and differently placed segmental gears carried thereby, and means for maintaining registration between contacts when the conveyor is not being driven.

3. In an electric sign comprising a plurality of independently displayed panel sections, an endless chain conveyor for each section, a plurality of stenciled or lettered boxes carried by each chain conveyor, the said conveyor being adapted to present one of the stenciled or lettered boxes at a time in registration with the display panel section, means for driving the said chain conveyors, said means including bevel gears, a shaft, a motor for continuously driving said shaft, a plurality of segmental gears secured to the shaft and adapted to mesh with the bevel gears for part of each revolution of the shaft, means associated with the bevel gears for driving the chain conveyors when said bevel gears are driven, the segmental gears being so placed that they mesh at different times with their corresponding bevel gears, whereby all the lettered boxes are intermittently advanced and successively presented.

In testimony whereof, I hereunto affix my signature.

WALTER L. WARD.